United States Patent
Mueller

[15] 3,659,713
[45] May 2, 1972

[54] METHOD AND APPARATUS FOR RECOVERING IMPURITIES FROM THE SURFACE OF A LIQUID

[72] Inventor: Frederick N. Mueller, Dallas, Tex.
[73] Assignee: Tetradyne Corporation, Dallas, Tex.
[22] Filed: Jan. 16, 1970
[21] Appl. No.: 3,351

[52] U.S. Cl. .......................... 210/83, 210/242, 210/DIG. 21
[51] Int. Cl. .................................................. E02b 15/04
[58] Field of Search .......................... 210/83, 242, DIG. 21

[56] References Cited

UNITED STATES PATENTS

| | | | |
|---|---|---|---|
| 3,348,690 | 10/1967 | Cornelissen | 210/242 |
| 2,628,190 | 2/1953 | Langdon | 210/525 X |
| 763,325 | 6/1904 | Roche | 210/242 |

Primary Examiner—Jim L. DeCesare
Attorney—Richards, Harris & Hubbard

[57] ABSTRACT

Impurities are removed from the surface of a liquid by impinging an elongated fluid stream, preferably a gaseous stream, along a length of the surface and moving the impinging stream relative to the surface causing the impurities to move and concentrate in advance of the impinging action of the stream, and thereafter isolating the concentrated mass of impurities. An apparatus is also provided suitable for traversing a body of water and recovering impurities, such as oil and the like from its surface. A preferred apparatus includes a vessel having a pair of elongated booms which are adapted to extend forwardly and outwardly of the motion of the vessel. Each boom extends above the water and carries nozzles which are adapted for form a substantially continuous elongated gaseous stream for impinging upon the water between the booms to thereby concentrate floating impurities between the booms. In addition, the vessel is provided with impurity inlet means between the booms for collecting the concentrated impurities from the water.

10 Claims, 4 Drawing Figures

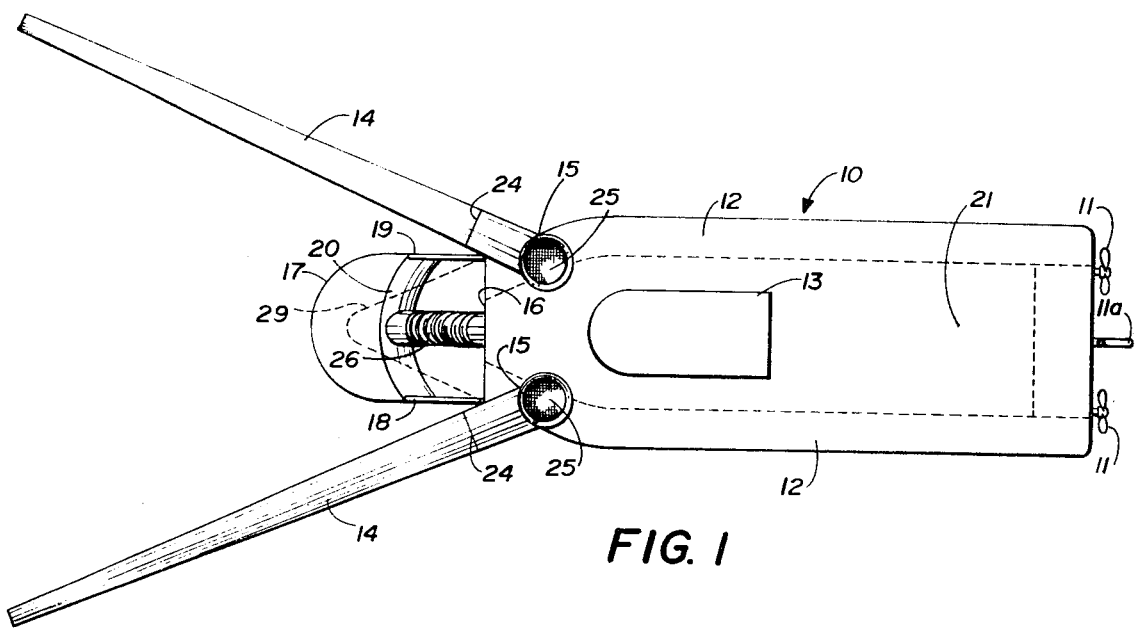
FIG. 1
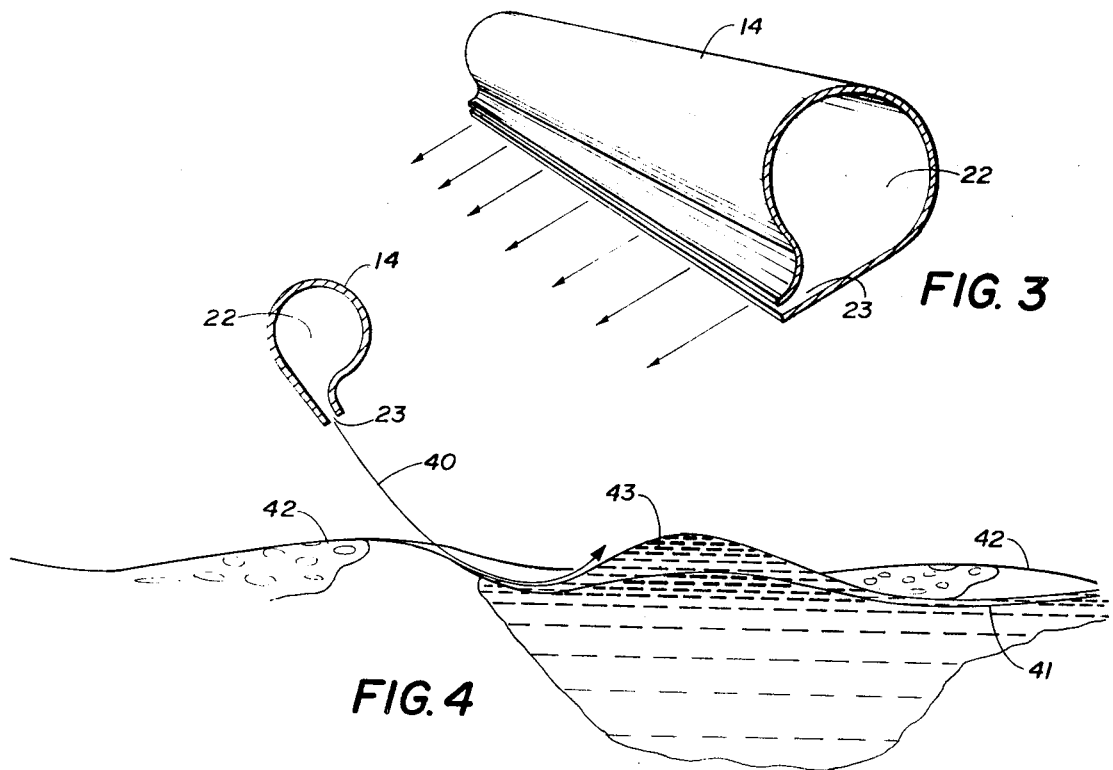
FIG. 3
FIG. 4
INVENTOR:
FREDERICK N. MUELLER
Richards, Harris & Hubbard
ATTORNEY

INVENTOR
FREDERICK N. MUELLER

Richards, Harris & Hubbard
ATTORNEY

METHOD AND APPARATUS FOR RECOVERING IMPURITIES FROM THE SURFACE OF A LIQUID

This invention relates to the removal of impurities from the surface of a liquid. In another aspect, this invention relates to a novel method of removing impurities from the surface of water. In still another aspect, this invention relates to a novel apparatus for removing impurities from the surface of water.

Pollution of national and international waterways by floating impurities is becoming an increasingly important problem. These impurities generally include water immiscible liquids such as oil, having a lower specific gravity than water, or particulate solids, such as for example, powdered or finely divided material such as small pieces of wood and the like. Of these various surface impurities, petroleum and petroleum products such as oil are generally a source of increasing pollution which is not only hazardous to marine and bird life but is a potential health hazard to man as well as a threat to the natural environment that augments his recreation and aesthetic enjoyment.

This oil pollution is generally caused by accidental oil discharges into the seas and waterways. Accidental oil spills in these waters result from various sources, such as, for example, the collision and/or sinking of oil tankers, barges, and the like and overboard discharges from such vessels. Additionally, pollution many times results from offshore oil drilling and production operations, including spillage from pipe lines and offshore storage. In addition to the pollution which occurs in the oceans, natural waterways become polluted from accidental spilling from oil pipelines, natural seepage, industrial wastes, and the like.

Various techniques have been developed in an effort to remove contaminants such as oil from the surface of the water. These methods generally include the addition of chemicals to the floating pollutants in an effort to destroy and/or dilute them, and physical means for removing pollutants from the surface of the water. Neither of these methods has heretofore proved to be highly effective.

Various water skimming devices have been developed which generally include a floating vessel carrying a pair of partially submerged sweeping booms which pass through the water, concentrate the impurities, and later isolate and recover the impurities. These types of sweeping vessels have met with only limited success because the submerged booms cannot function in rougher water without breaking, or damage resulting, and they impart tremendous drag to the vessel moving through the water such that speed and efficiency thereof is greatly reduced. In addition, the partially submerged booms collect any size object floating on the water, including the larger objects, such as timber, which action many times causes damage to the pollution recovery system within the vessel as well as to the booms.

Therefore, one object of this invention is to provide a novel means and method for removing impurities from the surface of a liquid.

Another object of this invention is to provide a novel sweeper vessel for removing impurities such as oil from the surface of a body of water and which can move relatively rapidly across the surface of the water.

A further object of this invention is to provide a novel vessel for selectively removing impurities such as oil, from the surface of water.

Still a further object of this invention is to provide a novel means and method for retrieving petroleum products which have become spilled upon the surface of a body of water.

According to the invention, a method is provided for removing impurities which are floating on the surface of a liquid by impinging an elongated fluid stream, preferably a gaseous stream, along a length of the surface and moving the impinging stream relative to the surface to thereby move and concentrate the impurities in advance of the impinging action of the stream, and thereafter isolating the resulting concentrated mass of impurities.

According to one embodiment of this invention, a second stream is impinged against a second length of said surface in an opposed relationship to the first stream, thereby acting to move impurities in advance of the second impinging action toward impurities moving in advance of the first impinging action, and forming a concentrated mass of impurities between the two streams. The concentrated mass is isolated on the surface, and if desired, removed therefrom.

According to another embodiment of this invention, an apparatus is provided for carrying out the methods in the above embodiments of this invention. Specifically, the apparatus comprises means for suspending elongated boom means over the surface of a liquid, which boom means carry nozzle means directed toward the surface of the liquid and adapted to emit a substantially continuous elongated stream of fluid, preferably a gas such as air against the surface at an angle of from 0° to 90° relative thereto, and means to supply fluid to the nozzle means.

According to a preferred embodiment of this invention a vessel is provided which is suitable for traversing a body of water and recovering impurities therefrom which includes at least a pair of said elongated boom means which extend divergently from the vessel. Thus, when the booms are so extended, opposed gaseous streams are emitted therefrom to impinge upon the water between the booms and concentrate any impurities therebetween. In addition, the vessel carries an impurity inlet means between the booms for collecting the concentrated impurities from the water, and a novel separation tank to assure complete separation of the impurities from the water entering the inlet means.

This invention can be more easily understood from a study of the drawings in which:

FIG. 1 is a plan view of a vessel of this invention;

FIG. 3 is a sectional view illustrating a detail of the vessel of FIG. 1; and

FIG. 4 is a schematic view illustrating the impinging action of the gas in accordance with this invention.

Figure 2:
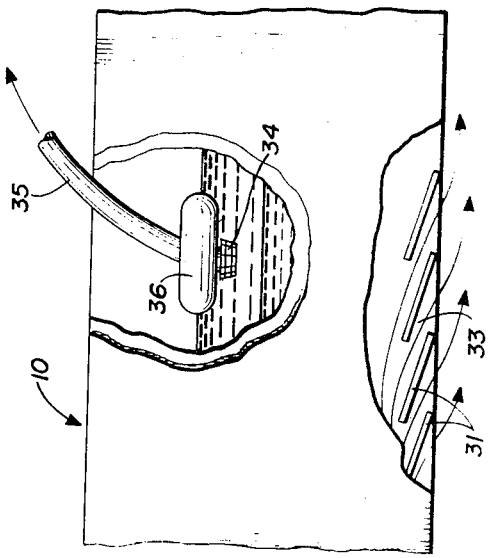
FIG. 2 is a partial elevation view of the vessel of FIG. 1.
Figure 2:
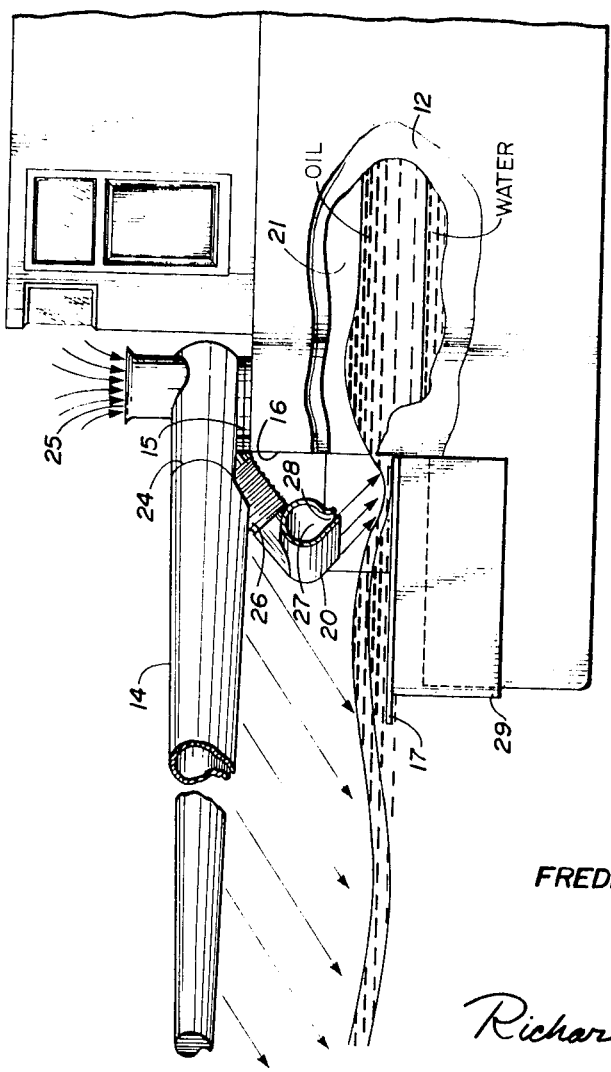

Now referring to FIG. 1, a preferred embodiment of this invention is illustrated which comprises vessel 10 which is equipped to remove impurities such as oil from the surface of a body of water by the action of impinging gaseous sweeping streams. Vessel 10 is equipped with propulsion means diagrammatically indicated at 11 as a pair of propellers which have suitable actuation means, such as a diesel engine or the like (not shown). A rudder is also shown at 11a. Alternatively vessel 10 can be moved through the water by a separate prime mover. For example, vessel 10 can be pushed through the water by a barge or tugboat or the like. Vessel 10 generally comprises a hollow body including a separation tank 21 having a perforated bottom which will be described in relation to FIG. 2, and floating bands 12, containing a suitable buoyant substance. For example, floating band 12 can contain a series of air compartments. Cabin 13 is positioned operatively on the vessel and includes suitable control means for vessel 10.

Booms 14 are mounted on the bow of vessel 10, preferably in pivotal relationship at points 15 respectively, so that each boom can be rotated through about 90°. Booms 14 are positioned to ride above the surface of the water, and are hollow and carry nozzle means for producing an elongated gaseous stream or curtain for impingement against the surface of the water. Suitable gas delivery means are operatively connected to the nozzles.

Impurity inlet 16 is operatively positioned through the bow of vessel 10 between booms 14. Weir 17 also connects to the bow of vessel 10 and projects outwardly therefrom substantially parallel to the surface of the water and forms the bottom portion of impurity inlet 16. Weir 17 generally comprises a substantially flat member which preferably is movably mounted in a vertical plane as will be described below to control the opening of impurity inlet 16. Baffle plates 18 and 19 extend from the sides of weir 17, as illustrated in the drawing. Curved nozzle bar 20 is suspended over weir 17 and carries back pressure nozzle means on the lower portion thereof to thereby exert pressure upon the impurity-carrying liquid on weir 17 in a manner as will be described below.

Now referring to FIGS. 2 and 3, some features of vessel 10 will be described in detail. As shown, each boom 14 is pivotally mounted to the bow of vessel 10 so that it is suspended over the surface of the water but is free to rotate approximately 90° about pivot point 15. Each boom 14 generally comprises a hollow member such as illustrated in FIGS. 2 and 3. This configuration provides a generally widened gaseous flow channel 22 which communicates with nozzle slot 23 along the length of the boom. Thus, the outlet of nozzle slot 23 is positioned to direct a gaseous stream to impinge against the surface of the water. It is also preferred that each boom 14 be rotatably mounted about its axis at point 24 in a manner so that the angle of nozzle slot 23 in relation to the surface of the water can be varied as desired. It is noted that nozzle slots 23 can effectively operate at angles from about 0° to about 90° relative to the surface of the water. However, it is generally preferred that the nozzles be positioned at an angle of from 45° to 75° relative to the surface of the water.

Suitable actuation means such as an electric motor, hydraulic or handcrank means or the like, can be operatively connected to booms 14 to provide for pivotal movement about points 15 and rotational movement about points 24. In addition, it is noted that while the particular nozzle slot configuration as illustrated in the drawings is preferred, it is within the scope of this invention to utilize any other suitable nozzle means which will provide a substantially continuous elongated fluid stream for impingement against the liquid furface. For example, a series of closely spaced apertures can be utilized on each boom instead of nozzle slots 23.

Booms 14 are operatively connected with a suitable gas supply means for supplying a constant flow of a suitable gas to flow channels 22. In the embodiment as illustrated in the drawings, booms 14 are operatively connected to the outlet of conventional air compressor means (not shown), and inlet air for the air compressor means is provided via inlet ducts 25.

Nozzle bar 20 is suspended over the rear portion of weir 17 by a suitable gas supply duct 26, which also communicates with the outlet of the compressor means which supplies air to flow channels 22 of booms 14. The cross sectional configuration of nozzle bar 20 is substantially the same as the cross sectional configuration of booms 14, and therefore provides for a flow channel 27 communicating with an elongated nozzle slot 28. If desired, nozzle bar 20 can be rotatably mounted over weir 17 to provide different angles of impingement of the gaseous stream emitted from elongated nozzle slot 28 upon the liquid on weir 17 according to the particular conditions. It is generally preferred that nozzle slot 28 be positioned at an angle within the range of from about 30° to about 60° to weir 17.

Weir 17, as shown in the preferred embodiment of FIG. 2 is carried by frame 29 which includes a v-shaped member which fits in movable relationship over the lower portion of the bow of vessel 10. Frame 29 is movable in a vertical plane in relation to bow 30 of vessel 10. Thus, frame 29 is operatively connected to a suitable actuation means such as an electric motor, hydraulic or handcrank means for adjustably positioning weir 17 a suitable distance below the surface of the water.

As described above, vessel 10 comprises an inner separation tank 21 having a perforated bottom and partially encompassed by floating bands 12. It is within the scope of this invention to eliminate the perforated bottom of separation tank 21 to yield a substantially open bottom. However, the configuration of the bottom of vessel 10 as illustrated in FIG. 2, is greatly preferred in that it will prevent turbulence and undue admixing between impurities such as oil, and water within the interior of separation tank 21 as vessel 10 moves across the surface of the water. Thus, it has been found that the positioning of baffles 31 in the bottom of separation tank 21 as illustrated, prevents water from flowing upwardly into separation tank 21 as the vessel passes thereover. Baffles 31 should be angled in the manner as illustrated in the drawing, to deflect and ride over the water as the vessel passes thereover and allow water from within separation tank 21 to pass out between openings 33. It is generally preferred that baffles 31 form an angle of from about 1° to about 60° with the surface of the water.

In operation, vessel 10 will initially move to the edge of a contaminated area on the water, for example, containing an oil film up to about one-sixteenth inch in thickness. The booms can be adjusted to diverge at a desired angle, for example, about 45°. Next, the air compressor means is actuated to deliver a stream of air to flow channels 22 within booms 14 to thereby cause a substantially continuous flow of air from nozzle slots 23 along the length of each boom. The resulting flow of air will impinge upon the surface of the water at a desired angle, for example, about 45°, and will be maintained at a velocity of from about 20 feet per second to about 100 feet per second. The action of the streams emitted from nozzle slots 23 will cause the oil floating on the surface of the water to move in advance of the impinging action thereof against the water and thereby concentrate in the area between the extended booms. This action is schematically illustrated in FIG. 4. As shown, the flow of air from nozzle slot 23 will form air curtain 40 which impinges upon surface 41 of the water carrying floating oil layer 42. The impinging action of curtain 40 causes the oil to concentrate in advance thereof in mass 43.

The vessel in the meantime, will be moving in the direction of the booms. This action will cause the concentrated oil entrapped between the two curtains of air emitted from the booms to pass over weir 17, between baffle plates 18 and 19 and into impurity inlet 16. During this time, a continuous flow of air is emitted from elongated nozzle slot 28 of nozzle bar 20. This flow of air can be from about 20 feet per second to about 100 feet per second and will be at an angle generally in the direction of impurity inlet 16. This impinging action of the curtain of air emitted from elongated nozzle slot 28 against the floating impurities passing over weir 17 is illustrated in FIG. 2. This action will in effect maintain the flow of the floating concentrated impurities over weir 17 and thereby prevent the backflow of any oil and/or water from separation tank 21 via impurity inlet 16.

As more oil is collected within separation tank 21 of vessel 10, it will begin to displace water therefrom via openings 33. In addition, as vessel 10 moves across the body of water, baffles 31 will deflect water from the body and thereby prevent its entrance into the interior of separation tank 21. This action will prevent any turbulence from forming within the interior of separation tank 21 by uprising water, and consequently prevent intermixing and possible emulsification of the oil therein. In addition, the action of the water deflecting against baffles 31 will enhance the flow of water from the interior of separation tank 21 via openings 33. It is noted, that it is within the scope of this invention to utilize adjustable baffles. For example, each baffle 31 can be rotatably mounted about its axis, for example, so that it can rotate 90° from a substantially flat position with relation to the water to a substantially perpendicular position. In addition, the baffles can be made to interlock when they are in the substantially flat position. In this latter instance, they can be interlocked when the interior of separation tank 21 is substantially filled with oil and vessel 10 is returning to its port or dock.

If desired, the oil captured within separation tank 21 can be removed therefrom by suitable pumping means and stored in a barge, or if desired, deposited within large rubber bags, sealed, and left floating on the water for later recovery by a suitable vessel. In one embodiment, the outlet 34 of hose 35 is operatively connected to float 36 so that it is constantly positioned on the surface of the oil within separation tank 21. Hose 35 is connected to a suitable pumping means which functions to pump out the oil within separation tank 21 and deposit it in any suitable receptacle, such as those described above.

It is noted that it is within the scope of this invention to provide means for varying the height of booms 14 above the surface of the water. This can be done with various alternative methods including lifting means separated to each boom, for example, hydraulic adjusting means or by controlling ballast within floating bands 12. Thus, suitable pumping means can be provided for pumping water, or any other suitable fluid into the interior of floating bands 12 to thereby control the depth to which vessel 10 is carried within the water. This will provide means for adjusting the booms 14 above the surface of the water, if they are in a vertically fixed position on the bow thereof.

Vessel 10 is equipped with suitable means for compensating for various types and heights of waves on the water. As previously described, frame 29 is movably mounted in a vertical plane. This action will not only adjust the relative depth of weir 17 with relation to the surface of the water, but will also regulate the size and location of impurity inlet 16 relative thereto. Thus, frame 29 can be adjusted so that weir 17 rides below the trough of the largest waves on any particular day.

While this invention has been described in relation to its preferred embodiments, it is to be understood that various modifications will now be apparent to one skilled in the art from a reading of this specification, and it is intended to cover such modifications as fall within the scope of the appended claims.

For example, it is within the scope of this invention to utilize the fluid curtain impinging effect of this invention for injecting suitable chemicals and/or reactants in contact with any impurities. For example, in instances wherein spilled petroleum products have caught fire, it is within the scope of this invention to emit carbon dioxide or any other fire extinguishing chemicals from the nozzles carried by booms 14. In some instances it may be desirable to utilize liquid chemicals and/or water as the fluid emitted from booms 14 and/or 20. In these instances, suitable liquid pumping means will be substituted for the air compressor means of vessel 10. However, when removing oil and other petroleum products from the surface of water, it is generally preferable to utilize a gas such as air as the fluid curtain as described above, in detail, in relation to an embodiment of this invention. The gaseous curtain will effectively function to sweep the oil cleanly over the water surface without dispersing or emulsifying any portion thereof.

Also, it is within the scope of this invention to mount one or more booms 14 to the sides, or adjacent the stern of a vessel such as vessel 10. In this instance, the booms will be mounted outwardly and forwardly of the movement of the vessel, with inlet means positioned adjacent the point of attachment of the boom to the vessel. Suitable inlet means would include a weir positioned below the surface of the water, and a cooperating nozzle bar 20 positioned thereover.

Additionally, it is within the scope of this invention to utilize a stationary boom of this invention positioned over a flowing waterway such as a river or canal, to thereby collect and concentrate impurities floating on the surface thereof. For example, in areas where it is common to have petroleum spillages or the like in a river, it is within the scope of this invention to position in a stationary manner one or more booms 14 at an angle to the current. These booms will emit the impinging curtain of air or the like against the impurities floating on the surface of the water and cause them to concentrate in advance of the impinging action in an opposite direction of the flow of the current. The impurities can then be skimmed from the surface of the water by suitable means such as vessel 10.

I claim:

1. An apparatus for removing impurities from the surface of a liquid comprising:
   a. a floating vessel;
   b. elongated boom means extending from said vessel above the surface of the said liquid and adapted to extend outwardly and forwardly of the direction of the movement of said vessel;
   c. nozzle means positioned along the lower portion of said boom adjacent said water for directing an elongated substantially continuous curtain of gas thereto;
   d. separation tank means carried by said vessel;
   e. an inlet means for said separation tank disposed on said vessel adjacent the attachment of said boom means; and
   f. baffle means positioned in the bottom of said separation tank means and angled to the direction of movement of said vessel to deflect liquid from said separation tank as said vessel passes thereover to allow said liquid to flow from said separation tank.

2. An apparatus for removing impurities from the surface of a liquid comprising:
   a. a floating vessel;
   b. elongated boom means extending from said vessel above the surface of said liquid and adapted to extend outwardly and forwardly of the direction of movement of said vessel;
   c. nozzle means positioned along the lower portion of said boom adjacent said water for directing an elongated substantially continuous curtain of gas thereto;
   d. a separation tank means; and
   e. inlet means for said separation tank disposed on said vessel adjacent the attachment of said boom means and comprising a substantially flat weir member extending from the lower portion thereof substantially parallel with but below the surface of said liquid, and opposed nozzle means positioned above said weir member for directing a substantially continuous curtain of gas across said weir in the direction of said inlet.

3. The apparatus of claim 2 wherein said weir member is movably mounted in a vertical plane to control the opening of said inlet means.

4. A method of removing floating impurities from the surface of a liquid comprising:
   a. impinging a pair of spaced, opposed, and diverging gaseous curtains upon the surface of said liquid;
   b. simultaneously moving said gaseous curtains in the direction of said impurities, thereby causing said impurities to concentrate between said gaseous curtains; and
   c. collecting said concentrated impurities as said gaseous curtain moves.

5. The method of claim 4 wherein said gaseous curtains comprise elongated air streams.

6. The method of claim 4 wherein said gaseous curtains are emitted from thin, elongated nozzle slots.

7. The method of claim 4 wherein each of said gaseous curtains impinges upon the surface of said liquid at an angle in the range of 45° to 75° thereto.

8. The method of claim 4 wherein said collecting comprises passing said concentrated impurities while floating on the surface of said liquid to the interior of a separation vessel.

9. The method of claim 8 wherein said impurities are passed into said separation vessel through an inlet zone comprising a flattened inlet surface positioned substantially parallel but below the surface of the liquid carrying said impurities, and having a gas curtain stream impinging thereon across the width of said inlet surface in the direction of said separation vessel to enhance the flow therein and prevent backflow therefrom.

10. The method of claim 9 wherein said gas curtain stream comprises an airstream.

* * * * *